2,716,666

PRODUCTION OF ANTHRANYL VINYL ETHERS

Walter Reppe, Ludwigshafen (Rhine), Germany, assignor to Badische Anilin- & Soda-Fabrik Aktiengesellschaft, Ludwigshafen am Rhine, Germany No Drawing. Application January 9, 1953, Serial No. 330,588

Claims priority, application Germany January 12, 1952

9 Claims. (Cl. 260—612)

This invention relates to anthranyl vinyl ethers and to a process for preparing them.

It is already known that phenols can be reacted with acetylene in the presence of alkaline-reacting catalysts to form aryl-vinyl ethers. If on the other hand phenols are treated with acetylene in the liquid phase while employing zinc or cadmium salts as catalysts, polyhydroxystyrenes are obtained.

I have now found, contrary to expectation, that anthrone(9-oxo-anthracene-dihydride-(9.10)) or anthranol-(9) or the derivatives of these substances can be reacted with acetylene in the presence of zinc or cadmium salts at elevated temperatures to form vinyl ethers of anthranol-(9) in good yields. It is known that anthrone is desmotropic with anthranol-(9). Anthrone is the stable modification, and this probably becomes rearranged to anthranol under the reaction conditions and reacts with the acetylene with the formation of vinyl ethers.

The reaction is preferably carried out in an indifferent solvent, such as benzene, toluene, xylene, tetrahydrofurane, dioxane or any other organic solvent which does not react with acetylene under these conditions. The most favorable reaction temperatures lie between 100° and 300° C., preferably at 170° to 200° C.

Especially suitable catalysts are those zinc and cadmium compounds which are extensively soluble in the reaction mixture, as for example the stearates, naphthenates or acetates of zinc or cadmium, and also the salts of these metals with any other organic acid, such as formic acid, propionic acid, butyric acid, valeric acid, alpha-methyl-valeric acid, oleic acid, abietic acid and the like.

The process may be carried out either at normal pressure or under increased pressure, preferably in the presence of indifferent gases, as for example nitrogen. The partial pressure of the acetylene should preferably amount to 10 to 25 atmospheres and the acetylene content for this test should preferably not be more than 70% by volume.

For the working up of the reaction mixture, any solvent employed is preferably distilled off and the anthranyl vinyl ether formed then distilled in vacuo. The distillate, while still liquid, is freed from small amounts of impurities, separated in crystalline form and then cooled, the anthranyl vinyl ether then separating in the form of yellow crystals.

The anthranyl vinyl ethers may be used as intermediates, for example for the production of plastics.

The following examples will further illustrate this invention but the invention is not restricted to these examples. The parts are by weight.

Example 1

300 parts of anthrone are suspended in 1600 parts of toluene and 30 parts of zinc stearate are added. The mixture is treated in a stirring autoclave at 180° to 190° C. with a mixture of nitrogen and acetylene in the volumetric ratio of 1:3 at a pressure of 20 to 25 atmospheres. The acetylene consumed is replaced by pressing in fresh acetylene. After the calculated amount of acetylene has been absorbed, the whole is allowed to cool and the toluene is distilled off from the filtered reaction mixture. The residue is then subjected to distillation under reduced pressure; the fraction passing over between 175° and 185° C. at 4 mm. Hg contains the anthranyl vinyl ether in yields of 75 to 80% of the theoretical amount. The liquid distillate is freed by suction from small amounts of deposited crystals which consist mainly of dianthrone with some anthrone and anthraquinone. From the filtrate, by inoculation, the anthranyl vinyl ether is obtained, by cooling, in the form of yellow crystals which melt at 47° C.

Example 2

400 parts of anthrone, 2500 parts of toluene and 40 parts of dry zinc acetate are charged in a stirring autoclave of stainless steel. After flushing the autoclave with nitrogen, a mixture of nitrogen and acetylene in a volume ratio of 1:2 are pressed in at a pressure of 15 atmospheres. The autoclave is heated up to 170° to 180° C. while stirring vigorously. The spent acetylene is replenished by continuously pressing in fresh acetylene. After about 60 hours the reaction is complete.

The autoclave is relieved from pressure after cooling, the toluene is distilled off and the reaction mixture is dissolved in ether. The anthrone thus precipitated is filtered off by suction, washed with ether and dried, about 75 parts of anthrone being recovered. After expelling the ether, the ethereal filtrate is distilled in vacuo, 230 parts of a distillate being obtained which has a boiling point of 162° to 178° C. at a pressure of 1.0 mm. Hg and contains 75 percent of anthranyl vinyl ether. The bottoms left are 190 parts of a resinous product. The purification is as in Example 1.

Example 3

A suspension of 40 parts of anthrone and 3 parts of cadmium stearate in 60 parts of toluene is treated with a mixture of nitrogen and acetylene in a volume ratio of 1:3 at a temperature of 180° to 200° C. and a pressure of 20 to 25 atmospheres in a shaking autoclave. The spent acetylene is replenished by pressing in fresh acetylene. When the reaction is complete, the toluene is distilled from the mixture and the bottoms left are distilled at reduced pressure. The fraction passing over between 175° and 185° C. at a pressure of 4 mm. Hg contains from 50 to 75 percent of anthranyl vinyl ether (percentage with reference to the theoretical yield). The purification is as in Example 1.

Example 4

300 parts of anthranol-(9), such as is obtainable, for example, by the acidification of a solution of an alkali metal anthranolate, are suspended in 1600 parts of toluene and, after adding 30 parts of zinc stearate, the suspension is treated with a mixture of nitrogen and acetylene in a volume ratio of 1:3 at a temperature of 180° to 190° C. and a pressure of 20 to 25 atmospheres in a stirring autoclave. The spent acetylene is replenished by pressing in fresh acetylene. When the calculated amount of acetylene has been taken up, the reaction mixture is allowed to cool and further processed as described in Example 1. The anthranyl vinyl ether is obtained in a yield of 75 to 80 percent of the theoretical yield.

Example 5

333 parts of 1.4-dimethylanthrone are suspended in 700 parts of toluene, then 30 parts of zinc stearate are added and the mixture is treated with nitrogen and acetylene in a volume ratio of 1:3 at a temperature of 180° C.

and a pressure of 20 to 25 atmospheres in a stirring autoclave. The spent acetylene is replenished by pressing in fresh acetylene. When the calculated amount of acetylene has been taken up, the reaction mixture is allowed to cool and the solvent is distilled therefrom after filtering off a dark colored solid. The bottoms are then distilled at reduced pressure, when a fraction containing 1.4-dimethylanthranyl-(9) vinyl ether passes over at a temperature of 160° to 190° C. and a pressure of 4 mm. Hg.

What I claim is:

1. A process for the production of an anthranyl-(9) vinyl ether which comprises reacting a compound selected from the class consisting of anthrone and 1,4-dimethylanthrone with acetylene in the presence of an organic acid salt of a metal selected from the class consisting of zinc and cadmium.

2. A process for the production of an anthranyl-(9) vinyl ether which comprises reacting a compound selected from the class consisting of anthrone and 1,4-dimethylanthrone with acetylene at temperatures between 100° and 300° C. in the presence of an indifferent solvent and a salt of an organic acid with a metal selected from the class consisting of zinc and cadmium.

3. A process for the production of an anthranyl-(9) vinyl ether which comprises reacting a compound selected from the class consisting of anthrone and 1,4-dimethylanthrone with acetylene having a partial pressure between 10 and 25 atmospheres at temperatures between 100° and 300° C. in the presence of an indifferent solvent and a salt of an organic acid with a metal selected from the class consisting of zinc and cadmium.

4. A process for the production of an anthranyl-(9) vinyl ether which comprises reacting a compound selected from the class consisting of anthrone and 1,4-dimethylanthrone with acetylene in the presence of zinc stearate and toluene at a temperature between 170° and 200° C. and a partial pressure of acetylene between 10 and 25 atmospheres, the acetylene being diluted with nitrogen.

5. A process for the production of an anthranyl-(9) vinyl ether which comprises reacting a compound selected from the class consisting of anthrone and 1,4-dimethylanthrone with acetylene in the presence of zinc acetate and toluene at a temperature between 170° and 200° C. and a partial pressure of acetylene between 10 and 25 atmospheres, the acetylene being diluted with nitrogen.

6. A process for the production of an anthranyl-(9) vinyl ether which comprises reacting a compound selected from the class consisting of anthrone and 1,4-dimethylanthrone with acetylene in the presence of cadmium stearate and toluene at a temperature between 170° and 200° C. and a partial pressure of acetylene between 10 and 25 atmospheres, the acetylene being diluted with nitrogen.

7. A process for the production of anthranyl-(9) vinyl ether which comprises reacting anthrone with acetylene at a temperature between 100° and 300° C. in the presence of an indifferent solvent and a salt of an organic acid with a metal selected from the class consisting of zinc and cadmium.

8. A process for the production of 1.4-dimethylanthranyl-(9) vinyl ether which comprises reacting 1.4-dimethylanthrone with acetylene at temperatures between 100° and 300° C. in the presence of an indifferent solvent and a salt of an organic acid with a metal selected from the class consisting of zinc and cadmium.

9. An anthranyl-(9) vinyl ether selected from the class consisting of anthranyl-(9) vinyl ether and 1,4-dimethylanthranyl-(9) vinyl ether.

References Cited in the file of this patent

UNITED STATES PATENTS

| 1,959,927 | Reppe et al. | May 22, 1934 |
| 2,017,355 | Reppe et al. | Oct. 15, 1935 |
| 2,615,050 | Insinger, Jr. | Oct. 21, 1952 |

FOREIGN PATENTS

| 370,082 | Germany | Feb. 26, 1923 |